(12) United States Patent
Bowen et al.

(10) Patent No.: US 6,466,637 B2
(45) Date of Patent: Oct. 15, 2002

(54) CRUD COLLECTION SYSTEM

(75) Inventors: Michael Bowen, Kennewick, WA (US);
Leonard Van Swam, Richland, WA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 09/871,222

(22) Filed: May 31, 2001

(65) Prior Publication Data

US 2002/0015464 A1 Feb. 7, 2002

Related U.S. Application Data

(60) Provisional application No. 60/208,188, filed on May 31, 2000.

(51) Int. Cl.[7] .......................... G21C 19/42; G01N 1/08
(52) U.S. Cl. .................... 376/310; 376/313; 73/863.23; 73/864.41
(58) Field of Search .................. 376/310, 245, 376/313, 409; 73/863, 864, 863.23, 864.33, 864.41

(56) References Cited

U.S. PATENT DOCUMENTS

| | | | |
|---|---|---|---|
| 4,483,205 A | | 11/1984 | Bellaiche et al. ......... 73/863.23 |
| 4,662,231 A | * | 5/1987 | Schaarschmidt et al. ..... 141/130 |
| 4,847,042 A | * | 7/1989 | Musiol et al. ............... 376/272 |
| 5,046,289 A | * | 9/1991 | Bengel et al. ........... 15/104.05 |
| 5,838,752 A | | 11/1998 | Shimamura ................. 376/260 |
| 6,064,708 A | * | 5/2000 | Sakamaki .................... 114/222 |

* cited by examiner

Primary Examiner—Michael J. Carone
Assistant Examiner—Daniel Matz
(74) Attorney, Agent, or Firm—Kenyon & Kenyon

(57) ABSTRACT

A CRUD collection system for removing deposits from a nuclear reactor fuel rod submerged in pool water. The system includes a sealable collection head for containing a portion of the fuel rod. The collection head includes at least one seal positioned to receive the fuel rod. Also provided is a liquid inlet communicating with an interior portion of the collection head, the inlet is configured to inject a liquid into the interior to displace the pool water therefrom. At least one blade is provided that is positionable in scraping engagement with the fuel rod. Also included is a liquid outlet for eliminating a CRUD sample and the liquid to a filter.

15 Claims, 6 Drawing Sheets

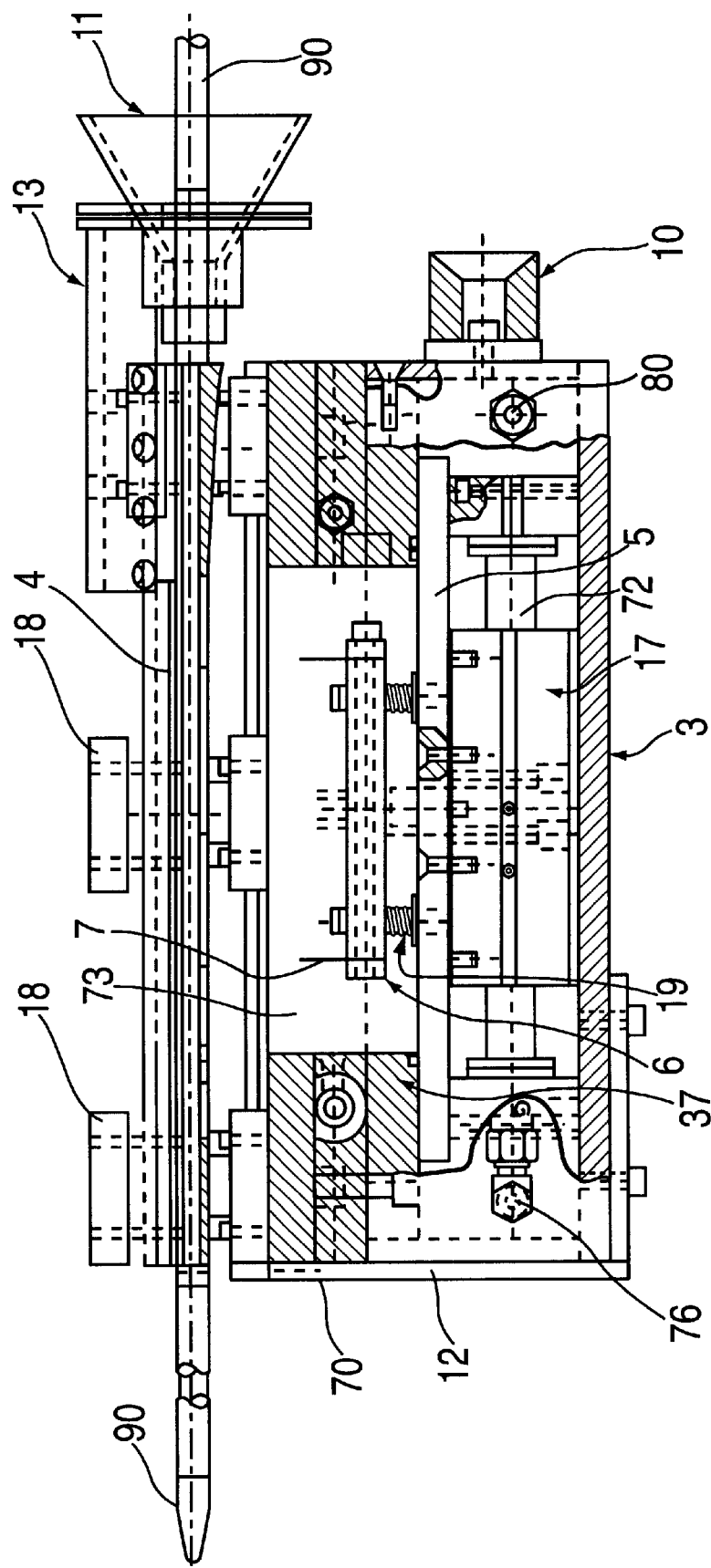

CRUD COLLECTION SYSTEM

CROSS-REFERENCED AND RELATED APPLICATIONS

This application is related to and claims priority on the basis of Provisional Application Serial No. 60/208,188, filed on May 31, 2000.

FIELD OF THE INVENTION

The present invention relates to a device and method for removing relatively uncontaminated CRUD samples from nuclear fuel assemblies, and more particularly, from nuclear fuel rods, for analysis.

BACKGROUND OF THE RELATED ART

Pressurized water reactors ("PWRs") which are used to generate nuclear power include reactor cores that have fuel assemblies. Fuel assemblies are usually are made up of elongated hollow metallic tubular cladding, known as "fuel rods," that contain nuclear fuel. Cladding functions to prevent fission products from being released from the fuel into the coolant/moderator and to prevent contact and chemical reactions between the fuel and the coolant/moderator. Common cladding maters include zirconium, zirconium alloys, and stainless steel. Zirconium based alloys—in which the major component is zirconium—have been used in the cladding of nuclear fuel rods or elements for several decades.

Irradiated fuel rods that have been expended in a reactor core are often stored in water-filled pools for deactivation. As time passes, CRUD collects over an oxide layer which forms on the nuclear fuel rods. CRUD can also collect on rods while they are in use. CRUD is an acronym for "chalk river unidentified deposit," referring to highly radioactive substances originally found on the inside of piping and components at the Chalk River Nuclear Reactor in Ontario, Canada. CRUD has now become standard nomenclature referring to minute, solid, corrosion products that travel into the reactor core, become highly radioactive, and then flow out of the reactor into other systems in the plant. CRUD can settle into crevices or form coatings on piping, fuel rods, and other surfaces in a reactor. The major components of CRUD are iron, cobalt, chrome, and manganese. CRUD is known to be a concentrated source of radiation and represents a significant radiological risk because of its insolubility. Therefore, not surprisingly, nuclear plant workers are known to receive radiation doses directly from CRUD exposure during refueling and maintenance outages. As such, it is important to analyze CRUD samples to determine the nature and amount of the deposits. Specifically, the samples can be analyzed to determine their elemental and isotopic composition and to provide an estimate of the activity of the CRUD material resident on the fuel rods.

It is known in the art to use an essentially manual device to retrieve a CRUD sample from nuclear fuel rods. Such a device usually consists of a scraping head at the end of a manually operated pole. The scraping head is often a stone substance that crumbles during use and can score the surface of the cladding. Additionally, biological protection is not typically provided in such a system itself. This can lead to handling difficulties both technically and in terms of governmental regulations.

Also known are mechanized devices for removing deposits from irradiated fuel elements. For example, one such device is disclosed in U.S. Pat. No. 4,483,205 to Bellaiche et al. This patent describes an apparatus that scrapes fuel rod surfaces by means of a remote-controlled scraping device. The scraped sample is sucked into an intermediate reservoir along with liquid from the pool. The sample—carried by the liquid—is passed into a filtration chamber that retains the sample. The liquid can then be passed back into the pool.

Prior art devices for collection of CRUD suffer from a number of shortcomings including, for instance, sample contamination, relatively low sample volume, and cladding scoring. Contamination occurs because pool water is used as the transportation media for the sample. The chemical composition of pool water can vary, and the water can also contain high levels of certain elements that can result in reduced accuracy and resolution of the sample. Contamination has also been shown to occur as a result of the crumbling of the consumable scraping stone during its use. The stone—which itself may include components of interest during analysis—can cause further contamination if it mixes with the deposit sample. Moreover, scraping stones often fail to cover a relatively sizeable area of the rod and become clogged. Each of these attributes limit the scraping efficiency of the stone and necessarily reduces the amount of CRUD removed from the rod. Stones are also known to score the surface of the cladding.

Thus, there remains a need for a CRUD collection system that overcomes the limitations of prior art devices.

SUMMARY OF THE INVENTION

It is therefore an object of this invention to provide a collection system that allows for the collection of a relatively uncontaminated sample of CRUD from an irradiated fuel rod.

It is another object of this invention to provide a collection system that allows for the collection of a relatively large sample of CRUD.

It is yet another object of this invention to provide a collection system that scrapes fuel rods to obtain CRUD samples without doing damage to the fuel rods.

To this end, the present invention provides for a CRUD collection system for removing deposits from a nuclear reactor fuel rod submerged in pool water. The system includes a sealable collection head for containing a portion of the fuel rod. The collection head includes at least one seal positioned to receive the fuel rod. Also provided is a liquid inlet communicating with an interior portion of the collection head, the inlet is configured to inject a liquid into the interior to displace the pool water therefrom. At least one blade is provided that is positionable in scraping engagement with the fuel rod. Also included is a liquid outlet for eliminating a CRUD sample and the liquid to a filter.

The system as described above, has been found to provide an exemplary means for collecting CRUD wherein the CRUD sample is uncontaminated by pool water. The system further provides a sealable chamber for enclosing part of a rod so that the rod can be surrounded by deionized water and subsequently sampled in a substantially contaminant-free environment.

Also provided is a method for collecting a CRUD sample that begins by removing a fuel rod from a fuel assembly. Next the fuel rod is inserted into a collection head. The collection head is closed and is then flushed with deionized water to remove pool water. The rod is then scraped with at least one scraping blade to remove the CRUD sample. The deionized water is filtered to remove the CRUD sample. The filter membrane is then removed so that analysis can be performed on the trapped CRUD sample.

Other objects, features and advantages of the present invention will become more apparent from the following description of the preferred embodiment of the present invention when considered in connection with the accompanying drawings.

BRIEF DESCRIPTION OF THE DRAWINGS

FIG. 2b is a side cross section view of the system shown in FIG. 2a, wherein the cover plate is in an open position, according to one embodiment of the invention;

DESCRIPTION OF THE PREFERRED EMBODIMENTS

Figure 1:
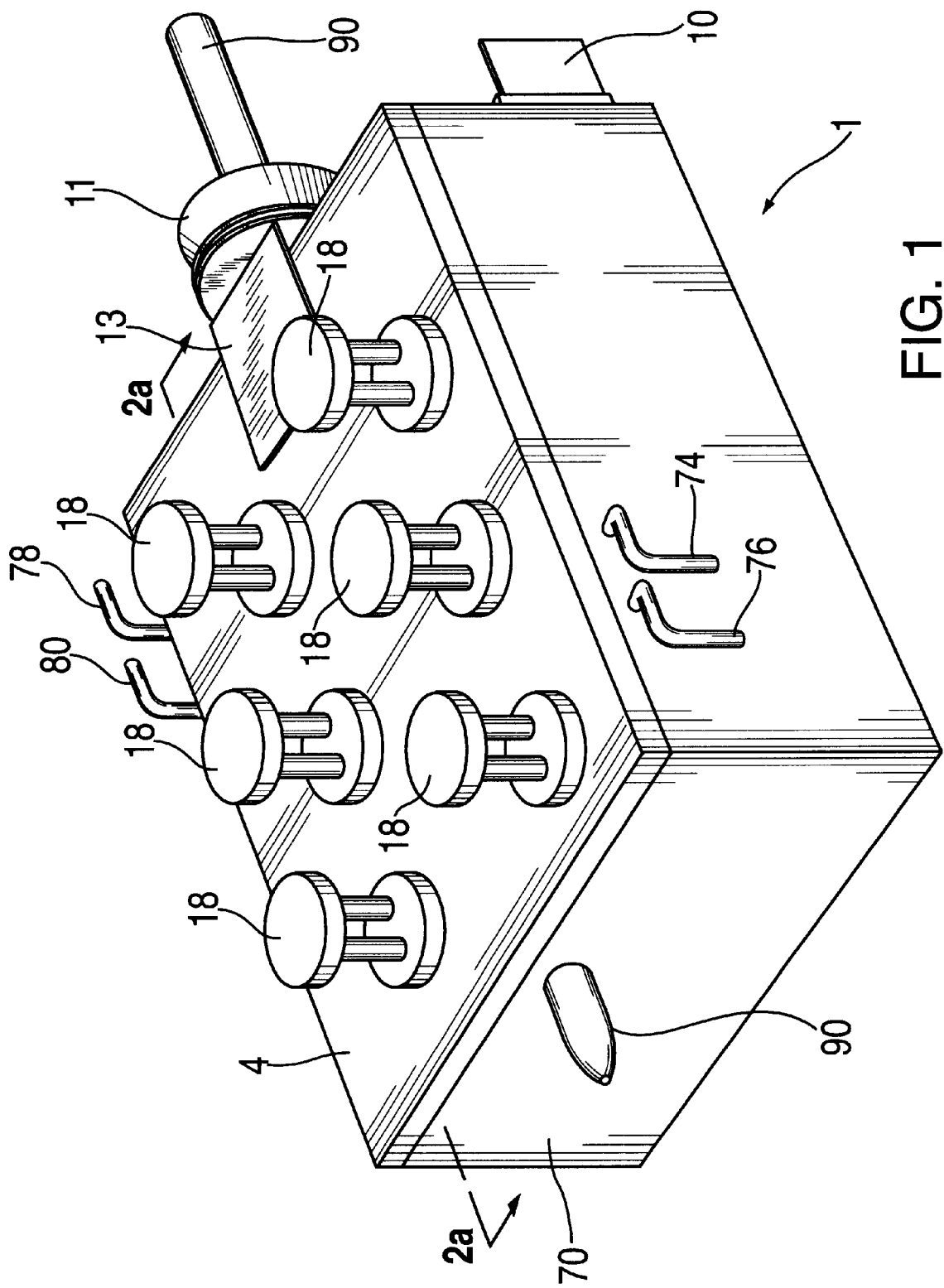
FIG. 1 is a simplified perspective view of a CRUD collection system, according to one embodiment of the invention.

As shown in FIG. 1, a CRUD collection system 1 of the present invention includes, for example, a shoe-box-sized sealable collection head 70 for enclosing part of a nuclear reactor fuel rod 90 while submerged in a water-filled pool (not shown). Collection system 1 also includes a mounting bracket 10 and a funnel weldment 11. Mounting bracket 10 can be used to help to maneuver system 1 into position in the pool. Additional equipment can be mounted to head 70 such as cameras and light sources (not shown). Otherwise, stand-alone cameras and light sources can be used. A remotely controlled vehicle (not shown) for maneuvering system 1 can also be attached to head 70. As described in more detail below, in one embodiment, funnel 11 can be used to receive rod 90 for eventual sampling within head 70. In the preferred embodiment, six cylinders 18 are disposed on head 70 to allow a slidably engaged cover plate 4 to move in an opened and closed position.

Also provided on the external portion of system 1 is a deionized water outlet 74 and an air outlet 76. Likewise, on the opposite side of system 1, a deionized water inlet 78 is provided along with an air inlet 80. These components can also be clearly seen in FIG. 3. Hosing (not shown) can be attached to inlets 78 and 80 for respectively providing a supply of deionized water and air to collection head 70. Outlets 74 and 76 may vent directly into the pool, or alternatively, they may also be attached to hosing should it be desired that outputted water and air is released at another location. For instance, in one embodiment, outputted deionized water flows, along with a CRUD sample to a control console 100 (FIG. 5) for filtration. As will be further discussed, a supply of air and deionized water is necessary to fully realize the benefits of the present invention.

Figure 2A:
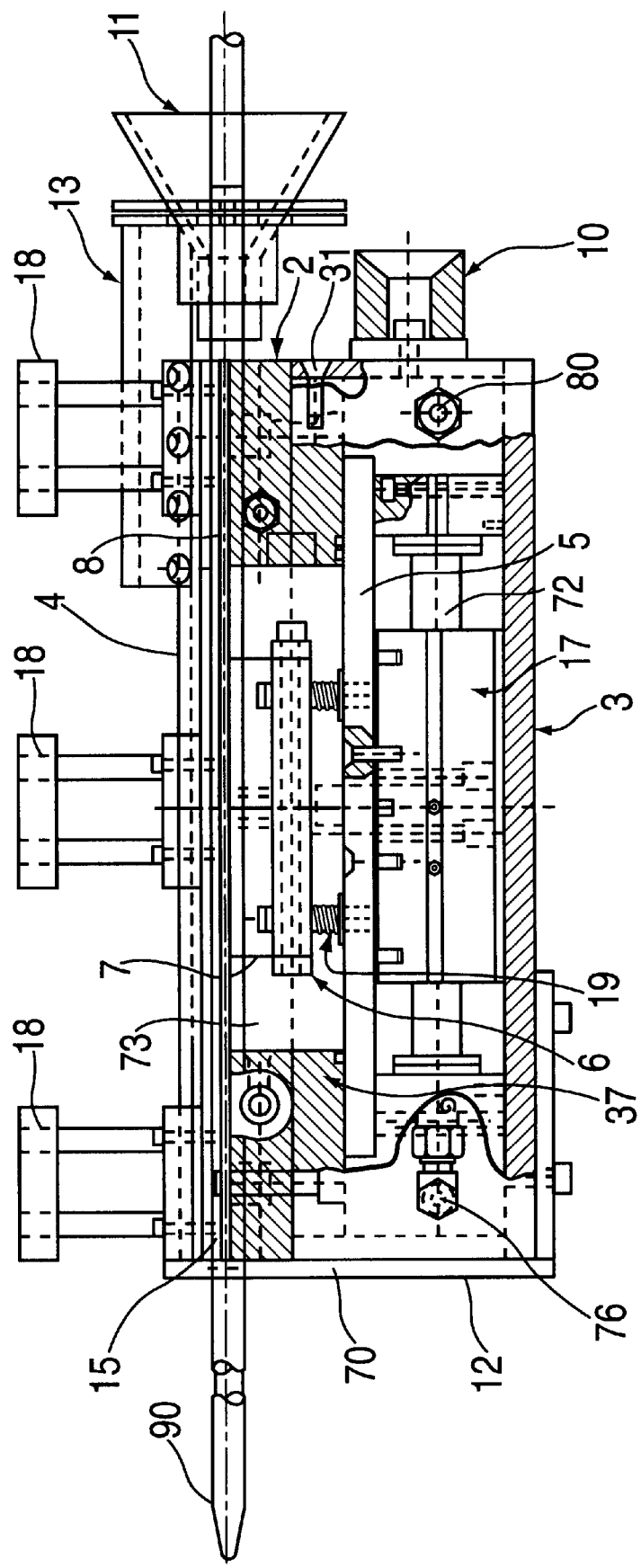
FIG. 2a is a side cross section view of the system shown in FIG. 1, taken along line II—II of FIG. 1, according to one embodiment of the invention.

As shown in FIG. 2a, collection head 70 is further divided into a sealed collection chamber 73 which provides a closed environment for removing deposits from rod 90. The closed environment makes it possible to collect CRUD samples on a relatively contaminant-free basis. As discussed below in further detail, collection head 70 contains devices that scrape CRUD from rod 90 while rod 90 is enclosed in chamber 73 of head 70. The scraped samples are ultimately trapped in a filter for analysis as is necessary.

Still considering FIG. 2a, the cross section of collection head 70 exposes the internal devices mentioned earlier. In the preferred embodiment, collection head 70 is assembled from a slide housing 3 that is enclosed at its front and the rear respectively by a mounting bracket weldment 12 and a seal plate 2. Slide plate 5 seals the top of slide housing 3. As for collection chamber 73, an openable cover plate 4 is also provided to enclose its top portion. In one embodiment, cover plate 4 is slidably connected to head 70 by means of cylinders 18 so that it can move to an open position as shown in FIG. 2b. Such a configuration is desirable because rod 90 can be engaged with head 4 before blades 7 are in scraping engagement with rod 90. Alternatively, cover plate 90 may be securely sealed to head 70. The various components can be held together by screws such as cap screw 31 shown holding seal plate 2 to other components of head 70. Additional cap screws can be seen in use throughout the device. However, other means known in the art may be used to securely fasten together components of head 70.

Figure 4:
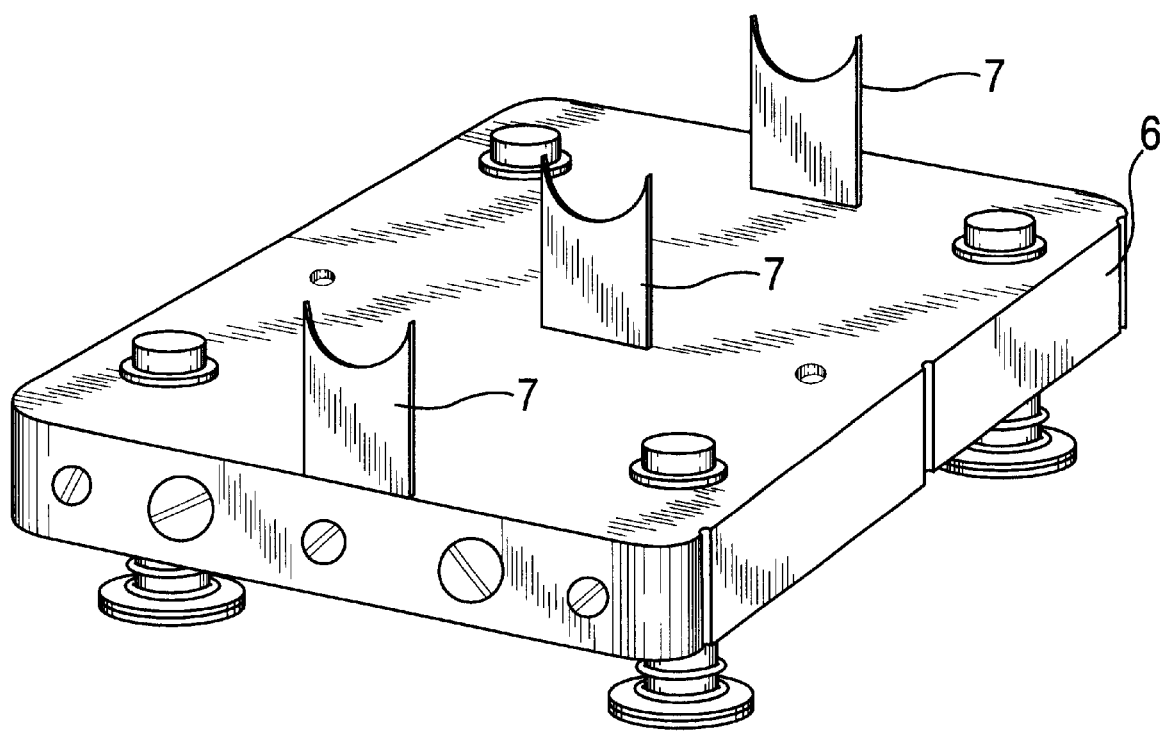
FIG. 4 is a simplified perspective view of a scraper plate of the system shown in FIG. 1, with mounted scraper blades, according to one embodiment of the invention.

Slide housing 3 includes a pneumatic cylinder 72 that is matingly engaged to a corresponding base slide 17 that is configured to slide along the length of cylinder 72. In one embodiment, slide housing 3 includes a self-contained locomotion means for moving slide 17. For example, in this embodiment, pneumatic cylinder 72 is supplied with air from inlet 80 to allow base slide 17 to move along cylinder 72. The speed of movement can be restricted by a hydraulic damper (not shown). A slide plate 5 is mounted to slide 17 allowing it to also move laterally back and forth. As shown in this embodiment, o-rings 37 are provided to seal collection chamber 73 from slide housing 3. Thus, while slide plate 5 moves laterally, a seal prevents pool water from entering chamber 73 from slide housing 3 A scraper plate 6—on which blades 7 are attached—is spring-mounted to plate 5 (FIG. 4). Springs 19 serve to urge blades 7 against rod 90. Thus, by moving base slide 17, which in turn moves base plate 5, which in turn moves scraper plate 6 and blade 7, blade 7 can scrape rod 90. As will be described in more detail, blade 7 may constitute multiple blades.

In the preferred embodiment, multiple blades 7, fabricated from zirconium alloy, are secured to scraper plate 6. Referring to FIG. 4, it is noted that blades 7 have a semicircular region which corresponds to rod 90. Preferably, blades 7 are relatively flexible. It has been found that a CRUD sample scraped from about six inches of rod 90 provides a quality sample for purposes of analysis. Thus, three blades 7 are provided in a specific embodiment where the blades are separated by two inches and are each designed to travel a distance of two inches. In this way, a total of six inches of CRUD is scraped from rod 90. Regarding the material from which blades 7 are fabricated, a zirconium alloy—which can be similar or identical to the material used to fabricate rod 90—is used because it has been found to prevent scratching of the cladding surface. It is generally known that underneath the CRUD layer there is an oxide layer that is harder than the cladding below. Because the scraping blades are made of the same or similar material as is the softer cladding, the CRUD can be removed without breaking through the oxide layer and damaging the cladding. Also, blades made from zirconium alloy are not drastically worn during use and therefore do not contaminate the sample.

Figure 3:
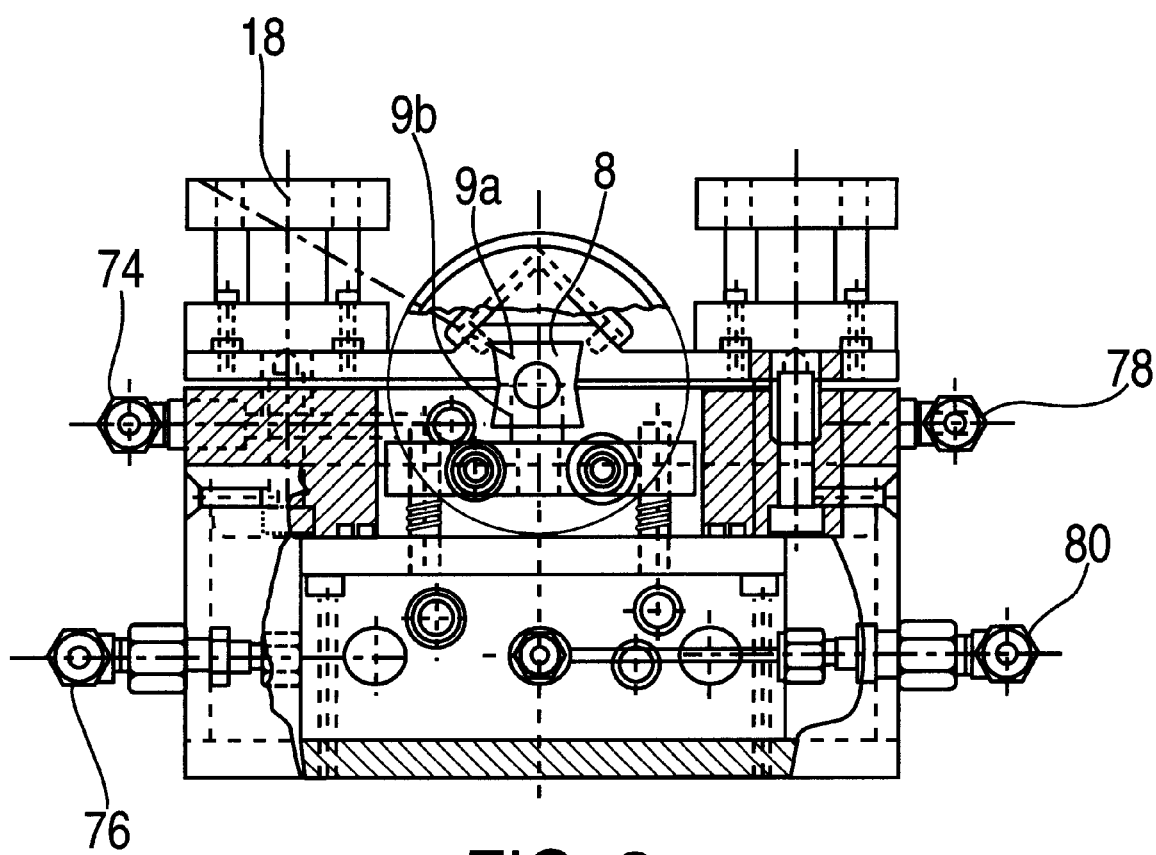
FIG. 3 is a front cross section view of the system shown in FIG. 1, taken along line III—III of FIG. 1, according to one embodiment of the invention.
Figure 5:
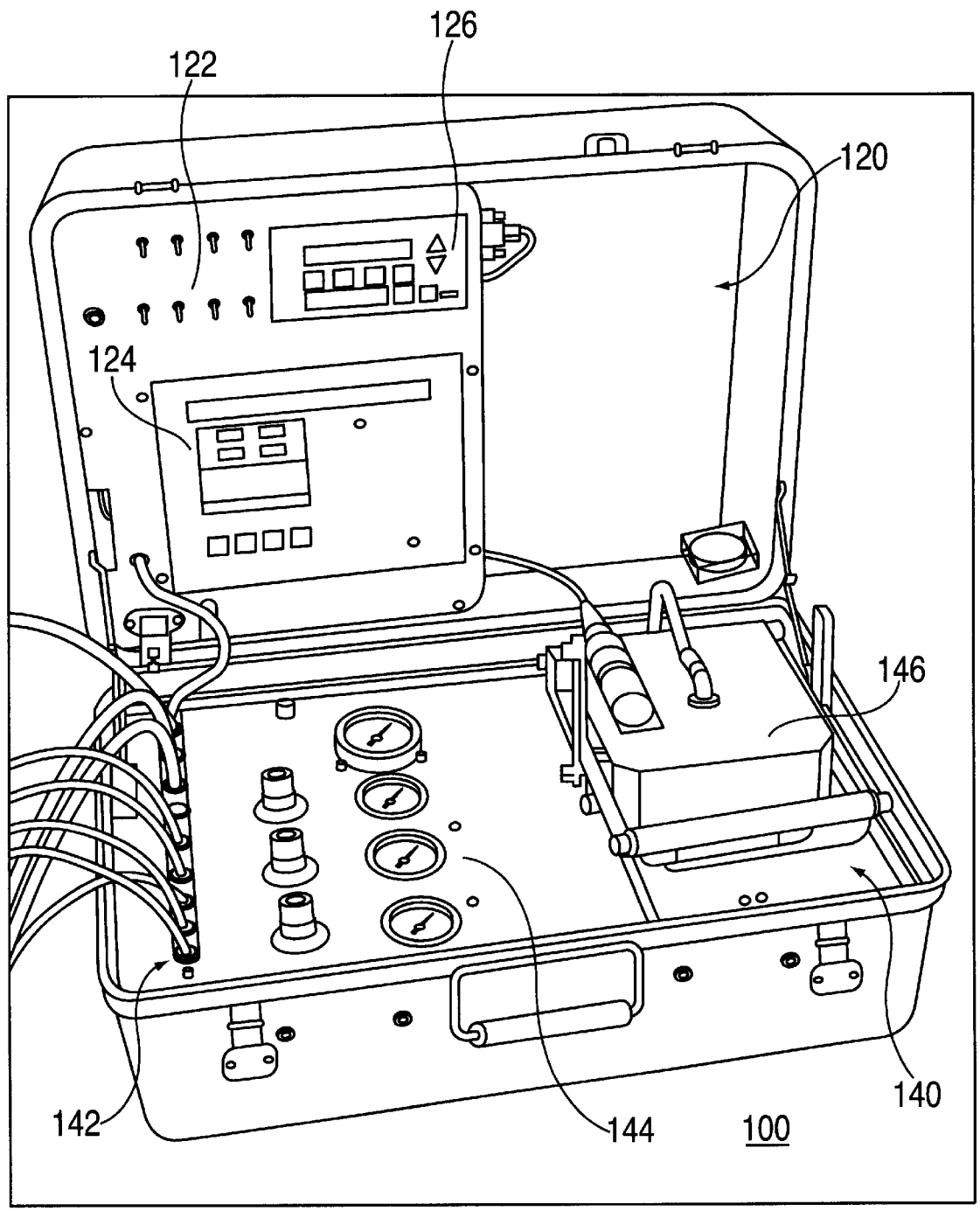
FIG. 5 is a perspective view of a control console for use in connection with the system shown in FIG. 1, according to one embodiment of the invention.

As mentioned, in one embodiment, funnel 11 is provided for receiving rod 90. Funnel 11 is mounted to cover plate 4 by means of bracket weldment 13. This allows funnel 11 to move with cover plate 4 to the open position as shown in FIG. 2b. Funnel 11 may includes rod seal 8 for creating a water tight seal around rod 90 once rod 90 is received into funnel 11. In one embodiment, as shown in FIG. 3, rod seal 8 is separable and include first part 9a and second part 9b. First part 9a is retained in cover plate 4 (or funnel 11) and is movable therewith. Second part 9b can be retained by seal plate 2 (FIG. 2a). When cover plate 4 is in the closed position as shown in FIG. 3, parts 9a and 9b engage one another to form a complete seal surrounding rod 90. An identical sealing device 15 (FIG. 2a) is provided to seal the opposite end of rod 90. Alternatively, a one-piece construction rod seal 8 may be disposed in cover plate 4.

one embodiment a control console 100 can be provided as shown, for example, in FIG. 5. In an upper portion 120 a bank of switches 122 is provided so that a user can change the system from automatic to manual for valves 74, 76, 78, and 80 and a pump (not shown) enclosed within console 100. A radiation monitor 124 is also provided. Monitor 124 is designed to shut off system 1 if a predetermined radiation level is reached at a filter housing (not shown) enclosed within console 100. A control panel 126 is provided for automatic control of system 1. For example, these controls may include input buttons for starting and stopping system 1 and a small LCD display that provides instructions and status of system 1.

A lower part 140 of console 100 is provided with connections 142 for water and air lines from valves 74, 76, 78, and 80. For example, these lines can be for water in, sample lines, water out, and pneumatic lines. In center portion 144 of lower part 140 there are provided water and air gauges, and pressure regulators. A filter housing 146 is configured to receive deionized water from system 1 for filtration of the CRUD sample.

In use, CRUD collector 1 is deployed into a deactivation pool (not shown) and can be maneuvered, for example, by remote control. For ease of operation, collector 1 may include a camera and illumination source (not shown). This would allow an operator to more easily steer collector 1 into position for making a deposit collection. In one embodiment, a pole (not shown) is attached to bracket 10 of collector 1. The pole can then be manually maneuvered in order to position collector 1. Once collector 1 is positioned in close vicinity to a fuel rod, funnel 11 can be positioned over the rod so that the two are radially aligned. At this time, cover plate 4 is in the open position as shown in FIG. 2b. By moving funnel 11 towards rod 90, rod 90 is held by rod seal 8 (FIG. 3). Now cover plate 4 is lowered by pneumatic or other means to seal a part of rod 90 in collector 1. This allows rod 90 to contact blades 7 and seals collection chamber 73. Springs 19 urge blades 7 against rod 90.

To prevent contamination of the sample, it is desirable to transport deposit samples in deionized water or another inert fluid rather than pool water. In one embodiment, deionized water is injected into collector 1 through inlet 78, while the contents of chamber 73 are purged to the pool through outlet 74. Over time, this has the effect of removing most of the pool water from chamber 73 and replacing it with deionized water. The procedure of collecting a sample of CRUD can then continue as discussed below.

After deionized water is in place in chamber 73, blades 7 are moved laterally to scrape a CRUD sample from rod 90. The CRUD sample—now suspended in the deionized water—may be separated from the deionized water by filtering through a membrane (not shown) and stored for eventual analysis. In one embodiment the aforesaid filtration takes place in filter housing 146 of console 100. However, it is understood that head 70 may itself include a filtration device eliminating the need for a separate console 100. Likewise, all components of console 100 may be combined into head 70.

In this way, a method is provided whereby a CRUD sample is obtained in a relatively contaminant-free manner.

While the foregoing description and drawings represent the preferred embodiments of the present invention, it will be apparent to whose skilled in the art that various changes and modifications may be made therein without departing from the true spirit and scope of the present invention.

What is claimed is:

1. A CRUD collection system for removing deposits from a nuclear reactor fuel rod submerged in pool water, the system comprising:
    a sealable collection head for containing a portion of said fuel rod, the head comprising:
        at least one rod seal positioned to receive said fuel rod;
        a liquid inlet communicating with an interior portion of the collection head, the inlet configured to inject a liquid into the interior portion to displace said pool water therefrom;
        at least one blade positionable in scraping engagement with said fuel rod; and
        a liquid outlet configured to eliminate a CRUD sample and the liquid from the interior portion;
    a filter in fluid connection with the liquid outlet.

2. A CRUD collection system as set forth in claim 1, the system further comprising a control console for controlling the system.

3. A CRUD collection system as set forth in claim 2, the control console comprising:
    at least one pump configured to direct the flow of liquid and air into the collection head; and
    a filter housing for housing the filter, the filter coupled to the liquid outlet of the collection head, the filter configured to remove the CRUD sample from the liquid.

4. A CRUD collection system as set forth in claim 1, the system further comprising a funnel configured to receive said fuel rod for entry into the collection head.

5. A CRUD collection system as set forth in claim 1, the collection head further comprising a openable cover plate that provides access to the interior portion of the collection head when the cover is in an open position.

6. A CRUD collection system as set forth in claim 1, wherein the liquid is deionized water.

7. A CRUD collection system as set forth in claim 1, wherein the sealable collection head further comprises:
    a watertight collection chamber; and
    a slide housing for containing a device for moving the at least one movable blade.

8. A CRUD collection system as set forth in claim 1, wherein the device for moving the at least one movable blade is pneumatically operated.

9. A CRUD collection system as set forth in claim 8, wherein the system further comprises an air inlet to provide an air supply for the device.

10. A CRUD collection system as set forth in claim 1, wherein the at least one blade is formed of zirconium alloy.

11. A CRUD collection system as set forth in claim 1, wherein the at least one blade comprises three blades.

12. A CRUD collection system as set forth in claim 11, wherein each of the three blades is separated from another of the three blades by approximately two inches.

13. A CRUD collection system as set forth in claim 12, wherein each of the three blades are configured to travel a distance of approximately two inches.

14. A method for collecting a CRUD sample from a nuclear fuel rod comprising the steps of:

inserting the fuel rod in a collection head cover plate;

closing the collection head cover plate to enclose said fuel rod in a collection chamber filled with pool water;

flushing the collection chamber with deionized water to remove pool water from the collection chamber;

scraping said fuel rod with at least one scraping blade to remove the CRUD sample; and filtering the deionized water to remove the CRUD sample.

15. A method for collecting a CRUD sample from a nuclear fuel rod as set forth in claim 14 further comprising the step of:

removing the filter membrane and the CRUD therefrom.

* * * * *